United States Patent [19]
Morrison

[11] 4,127,215
[45] Nov. 28, 1978

[54] ACCESS PORT COVERING DEVICE

[75] Inventor: Donald L. Morrison, Anaheim, Calif.

[73] Assignee: Kaiser Aerospace & Electronics Corporation, Irvine, Calif.

[21] Appl. No.: 875,594

[22] Filed: Feb. 6, 1978

[51] Int. Cl.² ............................................. B65D 45/28
[52] U.S. Cl. ................................... 220/314; 220/256; 220/259
[58] Field of Search ............... 220/256, 259, 314, 315; 138/89; 251/189

[56] References Cited
U.S. PATENT DOCUMENTS

| | | | |
|---|---|---|---|
| 3,473,693 | 10/1969 | Fritz | 220/314 |
| 3,964,637 | 6/1976 | Luebke et al. | 220/314 |
| 4,055,274 | 10/1977 | Waldenmeier et al. | 220/256 |

Primary Examiner—George T. Hall
Attorney, Agent, or Firm—Kleinberg, Morganstern, Scholnick & Mann

[57] ABSTRACT

An improved access port cover latching assembly is provided with an interlock that normally requires the presence of a component within the access port. A first pin encounters the component and, when displaced, releases a second pin to slide, thereby allowing a latching assembly to seat fully, thereby securing the cover. An independent signalling device may be provided to indicate the absence of the component in the event that the interlock is intentionally defeated to enable latching of the cover.

12 Claims, 11 Drawing Figures

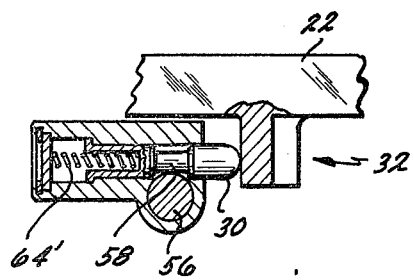
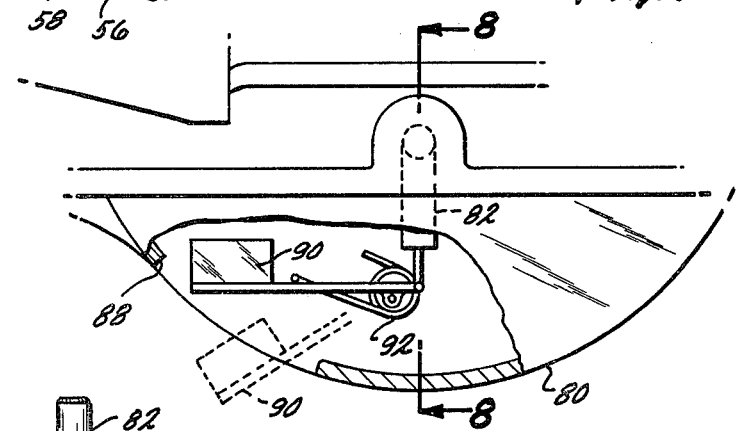
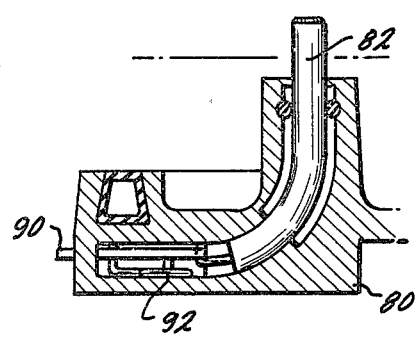
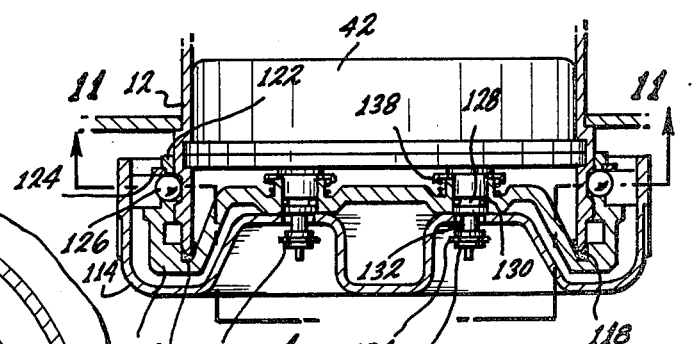
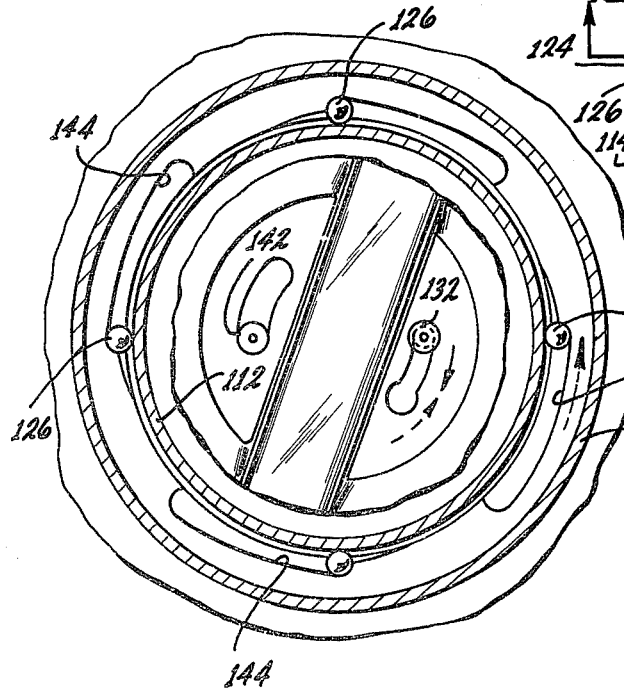
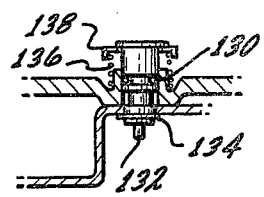

ACCESS PORT COVERING DEVICE

BACKGROUND OF THE INVENTION

1. Field of the Invention

The present invention relates to access port covering devices and, more particularly, to an improved, latching assembly which includes an interlock that is normally operated by the presence of a required component within the port.

On modern aircraft, various access ports are provided to enable inspection and operation of components and mechanisms which are located adjacent the exterior skin of the craft. Most if not all of these access ports require covers which can be secured and which form an effective, pressure tight seal so as to preserve whatever pressure differential may exist between the aircraft in flight and the surrounding environment.

2. Description of the Prior Art

Typically, a modern aircraft may have many access ports to enable filling or draining of onboard systems and, for that purpose the systems are provided with a plugs and/or other closures which are wholly independent of the access port cap or cover. For example, most aircraft human waste management systems include an accumulation-type tank which contains a recirculating fluid that must be drained and/or flushed when the aircraft has landed.

A combination for this purpose has been disclosed, for example, in the patent to Lynch, U.S. Pat. No. 3,010,694, which teaches a sealing plug capable of remote actuation for engaging and disengaging the plug, together with an appropriate coupler and assembly which enables an operator to drain the tank conveniently into a waste line, without accidental discharge of the contents.

The patent shows a handle for both removing and replacing the sealing plug as a part of the drain conduit. In proper operation, after the tank has been drained and/or flushed, the plug is replaced, the assembly is disconnected from the aircraft, and the access port is closed.

There are, however, occasion when the operator who removes the plug to drain the tank fails or neglects to replace the plug after the tank has been drained. It is also possible that a different operator may remove the assembly from the aircraft assuming, erroneously, that the drain plug had been replaced even though the assembly was not removed from the aircraft.

In either event, the access port can be closed without the drain sealing plug in place. Since the access port cap generally includes a sealing gasket, the absence of the drain plug will not result in leaks of the tank contents to the environment while the aircraft is in flight or on the ground. Generally, the subfreezing temperatures encountered by the aircraft in flight assure that any liquid that might leak through the seal is immediately frozen and, if a plug is missing, an accumulation of frozen waste may develop adjacent the access port cap.

The problem is most acute when the aircraft lands and must be serviced. Since the access port cap must be opened before the coupling assembly can be attached to the drain, the opening of the access port cap in the absence of a sealing plug, may result in an accidental discharge from the tank before the coupling assembly can be attached to the discomfort of the servicing personnel.

It has always been deemed desirable, if not necessary, to provide means for securing the access port cap. Various latching assemblies have been provided in the past. Further, because the failure to replace a drain plug may be inadvertent rather than intentional, it has been deemed a useful modification to provide an interlock assembly which cooperates with a drain plug in place, so that the access port cap cannot be secured in the absence of a drain plug. However, if the drain plug has been lost or is so damaged that it cannot be reinstalled, then the interlock should be such that it can be defeated or overridden to permit a closure of the access port cap so as not to disable the aircraft.

Accordingly, it is an object of the present invention to provide an improved access port cap assembly with an interlock that prevents the operation of the latch in the absence of a required component such as a drain plug.

It is an additional object to provide a vehicle with an access port assembly having an interlock mechanism that can be defeated in the absence of a required component, so that the vehicle is not disabled by the lack of a non-essential component, such as a waste drain plug.

It is yet another object of the invention to provide, in an access port cap, a latching mechanism which includes an interlock that cooperates with a required component but which, if defeated in the absence of such a component, will signal the absence.

SUMMARY OF THE INVENTION

In a preferred embodiment of the invention, as intended for use with an access port to an aircraft lavatory drain assembly, an improved access port cap is provided which includes an interlock that cooperates with the drain plug to permit the full closure of a latching lever. If it is necessary to defeat the interlock, which may be done manually, then, in the preferred embodiment, a telltale or "flag" is provided which independently signals the presence or absence of the drain plug, once the access port cap has been latched and secured in place.

In the preferred embodiment, the flag can be a pin which protrudes from the cap when a drain plug is properly installed but which remains flush with the surface of the cap in the absence of a drain plug. The "flag" can be of a distinctive color or shape so that the condition to be signalled, will be obvious to the observer.

While the present invention is discussed in the context of an aircraft lavatory drain access port and a cap therefor, the invention is equally applicable to any access port cap which conceals the presence or absence of a required component such as a plug or fitting. Further, the ability to provide a signal if the required component is in fact missing, gives adequate warning to the service crew to enable the replacement of the missing component if possible without necessarily impairing the usefulness of the craft.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 6 is a partial section view of the interlock assembly of FIG. 5 configured to prevent latching;

FIG. 7 is a partial sectional view of a cap with an alternative embodiment of an indicator assembly utilizing a flexible cable;

FIG. 8 is a sectional view of the assembly of FIG. 7, taken along the line 8—8, in the direction of the appended arrows;

FIG. 9 is a side sectional view of yet another embodiment of a cap of the present invention;

FIG. 10 is a partial sectional view of the interlock of FIG. 9 in the locked configuration; and FIG. 11 is a top sectional view of the embodiment of FIG. 9, taken along line 11—11 in the direction of the appended arrows.

DETAILED DESCRIPTION

Figure 1:
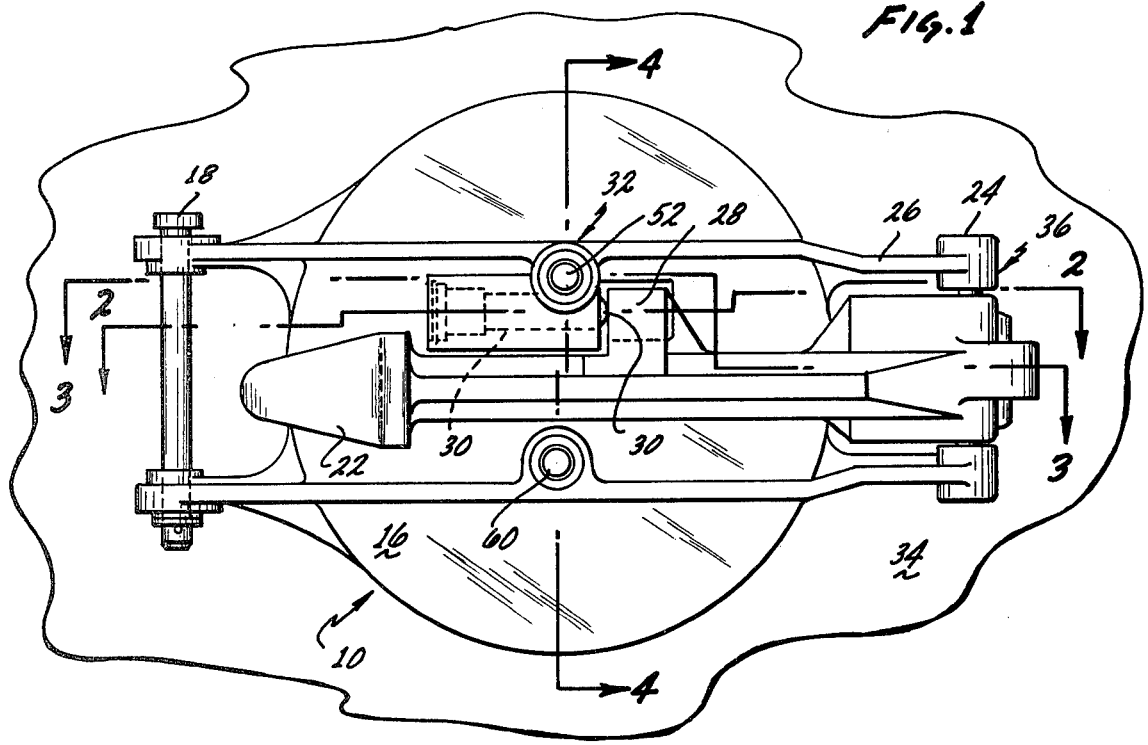
FIG. 1 is a top view of an access port cap according to the present invention.

Turning first to FIGS. 1 through 6, there is shown a preferred embodiment of an access port cap assembly 10 according to the present invention. The particular embodiment illustrated is intended for use with an aircraft lavatory drain system which includes a tubular drain 12 having seating grooves 14 adapted to receive a quick-connect coupler that is part of a draining and flushing system as shown in the Lynch patent. The cap assembly 10 includes a cap member 16 which is pivotally connected by a pin 18 mounting to a yoke 20 that is attached to the aircraft. The pin member 18 permits the cap member 16 to swing open and away from the drain 12.

A latching arm 22 is mounted to the cap assembly 10 and rotates about a pin 24 that is mounted in a yoke assembly 26 that is at the diametrically opposite side of the cap member 16. The latching arm 22 includes a projecting cam 28 which engages a slidable lock pin 30 that is part of an interlock assembly 32.

Figure 2:
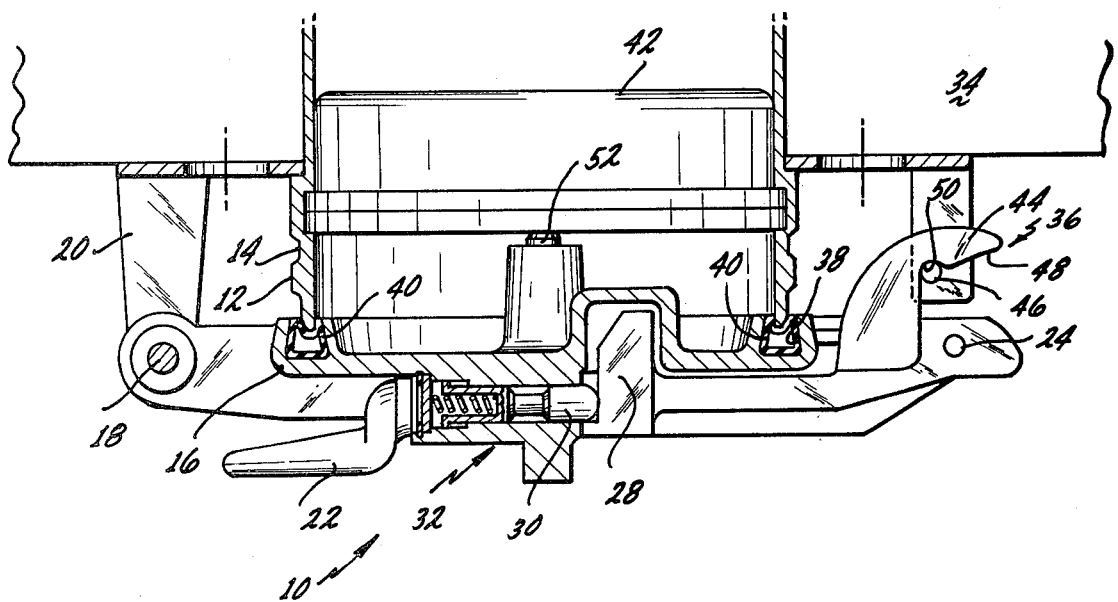
FIG. 2 is a side section view of the cap of FIG. 1 taken along the line 2—2 in the direction of the appended arrows.

The details of the cap assembly 10 are better seen in conjunction with FIGS. 2 through 6, which are sectional views of the cap assembly of FIG. 1 and which show details of the interlocking assembly 32. Turning first to FIG. 2, there can be seen the aircraft hull 34 upon which the cap assembly 10 is mounted as well as the mounting yoke 20 and the complementary latching bar assembly 36 which is engaged by the latching arm 22.

The tubular drain 12 is seated in an annular groove 38 of the cap member 16 and an appropriate circular gasket 40 is positioned in the groove 38 to effect a pressure tight seal against the drain 12. A required component in a lavatory drain system is a sealing plug 42, which is positioned within the tubular drain 12 and is designed to remain in place as a fluid tight seal. The construction of a typical tubular drain 12 and apparatus for coupling to it, and for removing the plug 42 are all shown, in detail, in the Lynch U.S. Pat. No. 3,010,694.

As shown in FIG. 2, when in the secure or latched position, the latching arm 22 is substantially flat on the surface of the cap 16. The cam 28 has fully depressed the lock pin 30 which is free to move since an actuating pin (best seen in FIG. 3) has been elevated to a position where a narrowed section is adjacent lock pin 30 permitting it to move laterally.

At the same time, a pair of latching hooks 44 fully engage bar 46 of the latching bar assembly 36 which is part of the structure of the craft and is an anchoring point to compress the circular gasket 40 against the tubular drain 12. The surface of the hooks 44 is shaped so that the initial engagement of the bar 46 by the hooks 44 is at a first curved end portion 48 which forces the cap 16 into even tighter engagement, and includes an overcenter, deeper curved part 50 which retains the latching arm 22 in the locked position.

Figure 3:
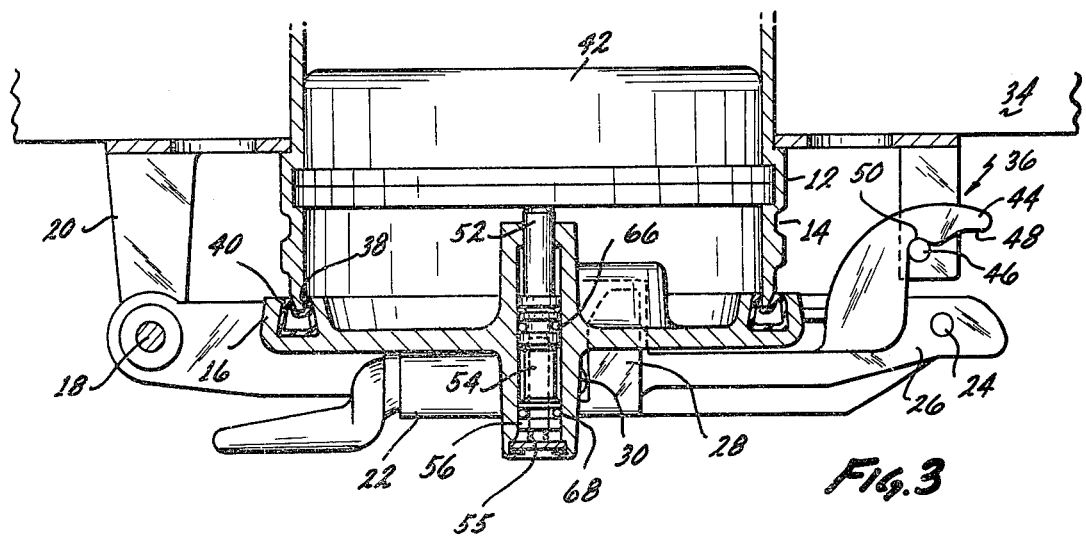
FIG. 3 is a parallel side section view of the cap of FIG. 1 taken along the line 3—3 in the direction of the appended arrows.

Similarly, FIG. 3 is a section which shows, in greater detail, an actuating pin 52 which is adapted to contact the drain sealing plug 42. As seen in FIG. 3, when the drain sealing plug 42 is in place, the actuating pin 52 is at its uppermost position, which places a reduced diameter portion 54 adjacent the lock pin 30, permitting it to travel freely in the lateral direction. The actuating pin 52 includes a bias spring 55 to force the pin 52 in the upward direction (as viewed in FIG. 3). In the absence of a drain sealing plug 42, a full diameter section 56 is adjacent a reduced diameter portion 58 of the lock pin 30, thereby preventing it from moving in the lateral direction.

If the lock pin 30 is unable to move, then the latching arm 22 cannot be fully lowered since the cam 28 will be unable to pass the lock pin 30. The hooks 44 will be unable to engage the bar 46, and the latching arm 22 will remain movable.

Figure 4:
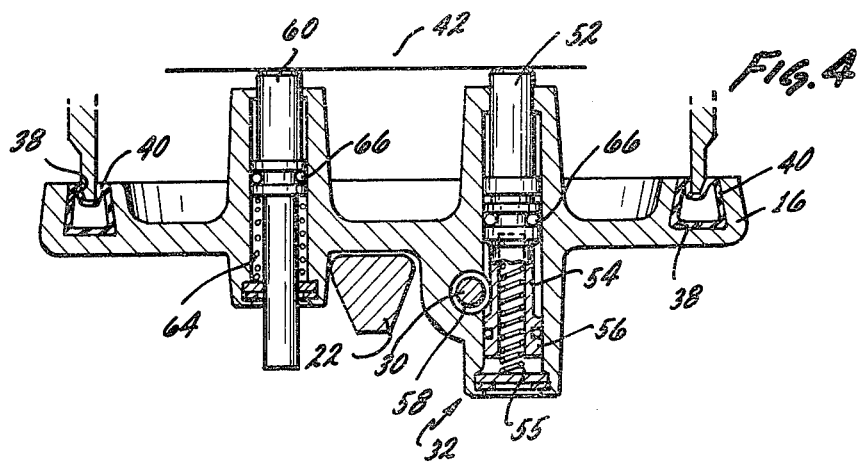
FIG. 4 is a side section view of the cap of FIG. 1 taken along the line 4—4 in the direction of the appended arrows.
Figure 5:
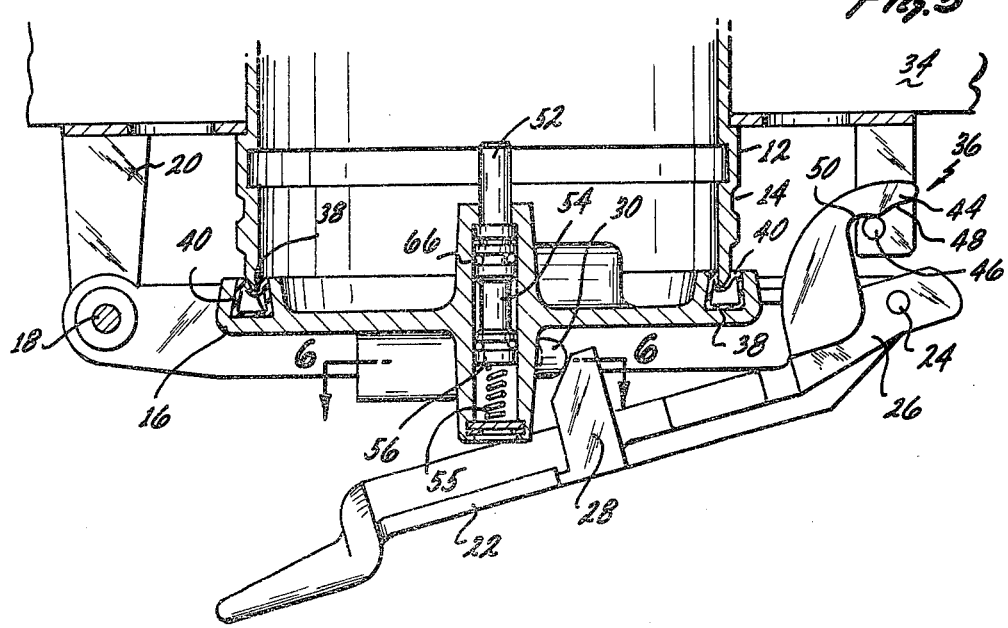
FIG. 5 is a view similar to that of FIG. 4 with the interlock preventing latching.

Turning now to FIG. 4, there is shown in side section view, both the actuating pin 52 and an indicating pin 60. Both pins include spring members 55, 64 to bias the pins in the downward direction. Further, both pins are provided with appropriate seals 66, 68 of the O-ring type to prevent loss of pressure or fluid.

The operation of both pins 52, 60 is rather straightforward. When a sealing plug 42 is present at its intended location, both pins 52, 60 are pushed against their respective springs 55, 64 and are held in place by the presence of the sealing plug 42 as the cap member 16 is closed. The actuating pin 52 then has a reduced diameter portion 54 positioned adjacent the lock pin 30 at its reduced diameter portion 58 which permits the latching arm cam 28 to force the locking pin 30 into its fully retracted position against the force of its bias spring 64'. When the hooks 44 of the latching arm 22 have fully engaged the latching bar 46, the indicator pin 60 will be elevated from the surface and may be a distinctive color, such as green, to indicate that a drain sealing plug 42 is, in fact, located within the tubular drain 12.

As noted above, and as best seen in FIGS. 5 and 6, if the drain sealing plug 42 is not installed, then the cam 28 will be unable to move the slidable lock pin 30 and the cover 16 will not be latched in place. However, it is possible to defeat the interlock mechanism by manually depressing the actuating pin 52 and, through the use of a thin object such as a screw driver or rule, the lock pin 30 can be manually depressed, as well. By holding the pin 30 in its depressed position, the cover 16 may then be closed and the latching arm 22 operated to engage the latching bar 46. The cam 28 will move without substantial obstruction and, once the inclined camming surface has passed the pin location, the screw driver or rule may be removed, since the lock pin 30 will be held in place by the cam 28.

In this configuration, the absence of the drain sealing plug 32 is signalled by the failure of the indicating pin 60 to protrude above the surface. Under the influence of its bias spring 64, the pin 60 is fully extended into the interior of the tubular drain 12.

Turning next to FIGS. 7 and 8, there is shown an alternative embodiment of an indicator mechanism which may be utilized in the present invention. A cap member 80 is provided with a flexible cable 82. At one edge of the cap 80, a slot 88 can be provided in which is positioned a telltale or flag 90 which is pivotally mounted to the interior of the cap member 80.

The free end of the flag 90 is then coupled to one end of the cable 82 which is arranged so that the opposite end of the cable is positioned to bear upon the drain sealing plug 42 (not shown) when the cap 80 is fully closed. A bias spring member 92 is provided to normally rotate the flag 90 to a position exterior of the cap 80.

Closure of the cap 80 with the drain sealing plug in place, bears upon the cable 82 against the bias of the spring which returns the flag 90 to a rest position within the cap slot 88. Therefore, if the latching assembly is manually overridden, the absence of a sealing plug will result in the flag 90 being extended and visible, thereby affirmatively signalling the absence of a plug.

Turning now to FIGS. 9-12, there is shown yet an additional embodiment, in which an interlocked latching access port cap 110 is provided which is essentially a cap member 112 with a rotatable outer collar 114 that cooperates with the tubular drain 12 in substantially the same fashion as the apparatus of the Lynch Patent, supra. The cap 112 includes an annular groove 116 in which is located a circular gasket 118.

The inner cap member 112 includes an actuating pin 120 which is adapted to bear against a drain sealing plug 42. Integral with the inner cap member 112 is an annular collar 122 which has a plurality of apertures 124 through which spherical balls 126 can protrude. An appropriate matching groove in the tubular drain 12 can be engaged much in the fashion of the apparatus of the Lynch Patent.

The actuating pin 120 includes a first, reduced diameter portion 128. A normal diameter portion is fitted with an O-ring seal 130. A second, reduced diameter portion 132 extends in the outward direction. A circlip or other split washer 134 locks the pin 120 once it is installed. A bias spring 136 is positioned within the inner cap member 112 and bears against the pin 120 in the inward direction to bias it into engagement with the sealing plug 42. A skirt portion 138 supports the bias spring 136 and furnishes the bias spring 136 with a surface upon which to bear when urging the pin 120 in the inward direction, as viewed in the figure. To facilitate assembly, the split ring washer 134 is not installed until after the pin 120 has been inserted through the inner cap 112. The pin 120 terminates in an extended reduced diameter portion 140 that can be used for the manual override of the interlock, as will be explained below.

A second, signalling pin 142 can be substantially identical to the actuating pin 120. It may be distinguished by color or other distinctions so that it can readily be identified as the indicator of the presence or absence of the drain plug 42.

The outer collar 114 includes a plurality of cam surfaces 144, which urge the balls 126 inward, through the apertures 124, to seat in the appropriate groove of the tubular drain 12.

A pair of arcuate openings 146, 148 is provided in the outer collar 114 to cooperate with the actuating pin 120 and signalling pin 142, respectively. The opening 146 includes a relatively narrow width portion 150 and an enlarged portion 152. Actuating pin 120 may move freely in and out of the enlarged portion 152 while the narrow width portion 150 can only accommodate the reduced diameter portion 132 of the pin. The other arcuate opening 148 is of uniform width and is sufficiently wide to accommodate the normal diameter of the signalling pin 142.

In the "in" position, the upper normal diameter portion of the actuating pin 120 is seated in the enlarged aperture portion 152, and the collar 114 is therefore held against rotation. However, if the drain sealing plug 42 is in place, the pin 120 is pushed outward and reduced diameter portion 132 of the pin is now adjacent the arcuate aperture 146 and will clear the narrow width portion 150, thereby permitting free rotation of the outer collar 114. Since arcuate opening 148 is sufficiently made to accept the signalling pin 142 over the entire length of the opening 148, signalling pin 142, whether "in" or "out" does not interfere with the rotation of the outer collar 114.

If it is necessary to override the interlock, the actuating pin 120 can be grasped at its end portion 140 and manually moved outward, permitting the collar 114 to rotate. Once the narrow width portion 150 engages the reduced diameter portion 132, the pin 120 can be released. The collar 114 can then be rotated to the locked position. The position of the signalling pin 142 will provide an indication of the presence or absence of a drain plug.

Thus, there has been shown, in different embodiments, an access port cover which cannot be unintentionally secured, in the absence of a required component within the access port. A first embodiment utilizes a latching arm which cams a blocking pin. In a second embodiment, a rotatable collar is rendered inoperable by an actuating pin. In both embodiments, the presence of the required component permits the latching mechanism to function without hindrance.

While the present invention has been described in the context of a lavatory drain assembly with an access port cover, other uses can be devised, such as covers for access ports to conduits leading to other fluid supplies which require closures, or other inspection or access ports in which components should be present, although their presence is not absolutely essential to the operation of the vehicle. If, however, the absence of a component is critical, then the latching assembly can be arranged so that a manual override or defeat is not possible.

Other embodiments and variations will occur to those skilled in the art and the scope of the invention should be limited only by the scope of the claims appended hereto.

What I claim as new is:

1. A combination for securing an access port cap in the presence of a required component in the port, the combination comprising:

(a) a cap adapted to cover an access port;
(b) fastening means attached to said cap for securing said cap in a closed condition; and
(c) interlock means mounted in said cap including a first member adapted to engage the required component and a second member, cooperating with said first member, and adapted to block said fastening means, whereby the absence of the required component prevents the access port cap from being unintentionally secured.

2. The combination of claim 1, further including
(a) hinge means for supporting said cap;
(b) latching means connected to the port and cooperable with said fastening means for securing cap in a closed position;
(c) said fastening means including a latching member adapted to engage said latching means;
(d) said interlock means being adapted to block said latching member.

3. The combination of claim 2, above, wherein said latching member is a lever arm having a hook portion and said latching means includes a bar engageable by said hook portion when said interlock means second member does not block said lever arm.

4. The combination of claim 1, further including an outer cap housing supporting said cap, said outer cap housing including a rotatable collar; and said cap fastening means include a ball element adapted to be urged into a holding groove on an element of the access port, and actuating means including a cam surface adapted to urge said ball inward when said collar is rotated.

5. The combination of claim 4, above, wherein said first member includes a pin member normally urged inwardly toward the required component and said second member is mounted on said collar and cooperates with a first portion of said pin to block said collar against rotation in the absence of the required component and, in the presence of the required component, cooperates with a second portion of said pin to enable rotation of said collar, thereby permitting the latching engagement of the holding groove and the ball element.

6. A combination for securing an access port cap in the presence of a required component in the port, the combination comprising:
(a) a cap housing including hinge means for supporting a cap and latching means for securing a cap in a closed position;
(b) a cap mounted to said hinge means and including a latching member adapted to engage said latching means; and
(c) interlock means mounted in said cap including a first member adapted to engage the required component and a second member, cooperating with said first member, and adapted to block said latching member, whereby the absence of the required component prevents the access port cap from being unintentionally secured.

7. The apparatus of claim 6 including signalling means for independently indicating the presence of the required member, whereby an intentional defeat of said interlock means in the absence of the required member can be signalled to subsequent operators of the latching member.

8. The apparatus of claim 16 including signalling means for indicating the absence of the required member, whereby defeat of said interlock means in the absence of the required component can be indicated to subsequent operators of the access port cap.

9. The apparatus of claim 6 including signalling means in said cap adapted to contact the required component for signalling the presence or absence of the required component when the cap is secured.

10. A combination for securing an access port cap in the presence of a required component in the port, the combination comprising:
(a) an outer cap housing including means for supporting an inner cap and latching means for securing a cap in a closed position;
(b) an inner cap mounted to said cap housing and including a latching member adapted to engage said latching means; and
(c) interlock means including a first member in said inner cap adapted to engage the required component and a second member in said cap housing, cooperating with said first member, and adapted to block operation of said latching member, whereby the absence of the required component prevents the access port cap from being unintentionally secured.

11. The combination of claim 10, above, wherein said outer cap housing includes a rotatable collar; and said inner cap latching member includes a ball element adapted to be urged into a holding groove; and said latching means include a cam surface adapted to urge said ball inward when said collar is rotated.

12. The combination of claim 10, above, wherein said first member includes a pin member normally urged inwardly toward the required component and said second member cooperates with a first portion of said pin to block said collar against rotation in the absence of the required component and, in the presence of the required component, cooperates with a second portion of said pin to enable rotation of said collar, thereby permitting the latching engagement of the holding groove and the ball element.

* * * * *